Patented June 24, 1952

2,601,275

UNITED STATES PATENT OFFICE 2,601,275

AROMATIC CHLORETHYLAMINES AND THEIR SALTS

William S. Gump, Upper Montclair, and Edward Joseph Nikawitz, Passaic, N. J., assignors to The Givaudan Corporation, New York, N. Y., a corporation of New Jersey No Drawing. Application October 29, 1949, Serial No. 124,481

5 Claims. (Cl. 260—570.8)

This invention relates to novel aromatic haloamines and salts thereof. These novel amines are tertiary amines having a cinnamyl

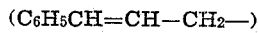

radical and a —$CH_2CH_2$ halogen radical. The cinnamyl radical may be substituted in the nucleus.

Specific members of our novel chemical compounds include the following:

N-(2-chloroethyl)-N-cinnamyl ethylamine hydrochloride.
N-benzyl-N-(2-chloroethyl) cinnamylamine hydrochloride.
N-benzyl-N-(2-chloroethyl)-o-methyl cinnamylamine hydrochloride.
N-p-methoxybenzyl-N-(2-chloroethyl) cinnamylamine hydrochloride.

In general, the novel salts of this invention may be prepared by reacting an equivalent amount of inorganic or organic acids with the corresponding amines, preferably in some cases under anhydrous or substantially anhydrous conditions. The amines may be prepared by reacting the corresponding hydrohalides with at least an equivalent amount of alkaline material, such as, for example potassium carbonate. The hydrohalides may be prepared in general by reacting the beta-alcohols of the amines with thionyl chloride or thionyl bromide.

The new salts of this invention are crystalline solids under usual atmospheric conditions and in general are soluble in alcohols and glycols, difficulty soluble in water and insoluble in ether and hydrocarbons. The new amines are in general high boiling liquids, varying in color from water-white to yellow. They are not soluble in water, but dissolve in ethyl alcohol, propylene glycol, and organic solvents generally.

Our novel chemical compounds exhibit unexpected and desirable medicinal properties, for example, as sympatholytic and adrenolytic agents. For therapeutic purposes these novel compounds may be administered orally or parenterally, and may be employed as tablets or in capsules or in solutions. In addition to their therapeutic properties our novel compounds are useful in organic chemical synthesis.

While our invention comprehends salts of the amines set forth above and acids in general, we prefer to employ those acids having an ionization constant of at least about $1 \times 10^{-2}$ at normal room temperature (about 25° C.). Examples of some suitable organic acids are picric, trichloroacetic, oxalic and maleic acids. Examples of some suitable inorganic acids are hydrochloric, hydrobromic, sulfuric, phosphoric (first hydrogen), perchloric, nitric and iodic acids.

In order to illustrate this invention more fully but without thereby limiting it, the following examples are given.

EXAMPLE 1

Preparation of N-(2-chloroethyl)-N-cinnamyl ethylamine hydrochloride (a) PREPARATION OF 2-(N-CINNAMYL-N-ETHYL) AMINOETHANOL Fifty-three grams of cinnamyl chloride were dropped during one hour into 65 grams of 2-ethylaminoethanol while the contents were stirred and heated at 100° C. Heating at 100° C. was continued for 5 hours more. 200 cc. of a 20% sodium hydroxide aqueous solution were added after the reaction mixture had cooled to room temperature. The amino alcohols were extracted with 400 cc. of benzene and the benzene layer was washed with 300 cc. of water, dried and filtered. After removal of the solvent, the desired amino alcohol distilled as a yellow oil at 164–170° C. (4 millimeters of mercury); yield 42.1 grams; $n_D^{20}$ 1.5528; purity (determined by potentiometric titration) : 102%.

(b) PREPARATION OF N-(2-CHLOROETHYL)-N-CINNAMYL ETHYLAMINE HYDROCHLORIDE

| | |
|---|---|
| 2-(N - cinnamyl - N - ethyl) aminoethanol. | 39.9 grams in 100 cc. of chloroform |
| Thionyl chloride | 26 grams in 100 cc. of chloroform |

The thionyl chloride was dropped during 2 hours into the amino alcohol under stirring and cooling in an ice bath. After standing for a few hours at room temperature, the solvent was removed by distillation. The solid residue was recrystallized from 100 cc. of ethyl alcohol and 300 cc. of isopropyl ether and again from 100 cc. of ethyl alcohol and 200 cc. of isopropyl ether. 34 grams of white crystals with a M. P. of 150–152° C. were obtained.

Anal. Calcd. for $C_{13}H_{19}NCl_2$: Cl ion, 13.6; Cl total, 27.3. Found: Cl ion, 13.7; Cl total, 27.3.

EXAMPLE 2

Preparation of N-benzyl-N-(2-chloroethyl) cinnamylamine hydrochloride (a) PREPARATION OF 2-(N-BENZYL-N-CINNAMYL) AMINOETHANOL Forty-six grams of cinnamyl chloride and 95 grams of 2-benzylaminoethanol were brought to reaction following the procedure described in Example 1a. By distillation at 4 millimeters of mercury pressure 54.4 grams of the desired amino alcohol was obtained as a yellow oil; B. P. 217–225° C. (4 millimeters); $n_D^{20}$ 1.5878; purity 101% (by potentiometric titration).

(b) PREPARATION OF N-BENZYL-N-(2-CHLOROETHYL) CINNAMYL-AMINE HYDROCHLORIDE

Fifty-two grams of the above amino alcohol (Example 2a) dissolved in 100 cc. of chloroform and 27 grams of thionyl chloride in 100 cc. of chloroform were brought to reaction as described in Example 1b. The residue obtained after removal of the solvent was resinous. Consecutive crystallizations using: (1) 100 cc. of ethyl alcohol and 600 cc. of isopropyl ether, (2) 100 cc. of ethyl alcohol and 300 cc. of isopropyl ether, (3) 200 cc. of ethyl alcohol and 500 cc. of isopropyl ether, and finally (4) 200 cc. of ethyl alcohol and 500 cc. of isopropyl ether yielded 17.9 grams of the desired compound in the form of white crystals with a M. P. of 150–152° C.

Anal. Calcd. for $C_{18}H_{21}NCl_2$: Cl ion, 11.0; Cl total, 22.0. Found: Cl ion, 11.1; Cl total, 22.1.

EXAMPLE 3

*Preparation of N-benzyl-N-(2-chloroethyl)-o-methyl cinnamylamine hydrochloride*

(a) PREPARATION OF o-METHYL CINNAMYL BROMIDE

A Grignard solution was prepared in the usual manner from 72 grams of magnesium and 500 grams of o-bromo-toluene dissolved in 900 cc. of absolute ethyl ether. 170 grams of acrolein dissolved in 600 cc. of absolute ethyl ether were added during one hour to the stirred Grignard solution while the contents were cooled to −10° C. to 0° C. Stirring at this temperature was continued for 2 hours and finally for 12 hours at room temperature.

The formed addition product was decomposed by pouring it slowly onto a mixture of ice, water and hydrochloric acid. The ether layer containing the reaction product was washed twice with a 10% sodium bicarbonate aqueous solution and dried with anhydrous sodium sulfate. After filtration and removal of the solvent, 143 grams of o-tolyl allyl carbinol were obtained by distillation; B. P. 115–123° C. (5 millimeters of mercury); $n_D^{20}$ 1.5462. Considerable amounts of high boiling, resinous substances were also formed.

o-Tolyl allyl carbinol is not very stable and polymerizes on standing.

Seventy grams of o-tolyl allyl carbinol were slowly added under stirring to 460 grams of acetic acid containing 30% (by weight) of hydrogen bromide. After being stirred for 15 minutes, the reaction product was poured into 3 liters of water and extracted with 500 cc. of ether. The ether solution was washed twice with a 10% sodium bicarbonate aqueous solution, then with water alone, and then dried with anhydrous sodium sulfate. After filtration and removal of the solvent, 90.7 grams of o-methyl cinnamyl bromide distilling at 135–145° C. (4 millimeters of mercury) were obtained. This compound is not very stable and some hydrogen bromide is formed on standing.

(b) PREPARATION OF 2-(N-BENZYL-N-o-METHYL CINNAMYL) AMINOETHANOL

Forty-two grams of o-methyl cinnamyl bromide were dropped during one hour into sixty-two grams of 2-benzyl aminoethanol and heated to 100° C. under agitation. Heating at this temperature and stirring was continued for 3 hours. After the mixture had cooled to room temperature 200 cc. of a 20% sodium hydroxide aqueous solution were added and the amino alcohols extracted with 200 cc. of benzene. The benzene layer was washed with 300 cc. of water and dried with anhydrous sodium sulfate. After removal of the solvent, 23 grams of the desired amino alcohol distilled as a yellow oil at 222–235° C. (4 millimeters of mercury); $n_D^{20}$ 1.4789; purity 99% (determined by potentiometric titration).

(c) PREPARATION OF N-BENZYL-N-(2-CHLOROETHYL)-o-METHYL CINNAMYLAMINE HYDROCHLORIDE

Twenty-two grams of the above amino alcohol (Example 3b) dissolved in 100 cc. of chloroform and 12 grams of thionyl chloride in 50 cc. of chloroform were brought to reaction as described in Example 1b. After allowing the reaction mixture to remain at room temperature for 12 hours, the solvent was removed by distillation. The remaining resin was obtained in form of white crystals (9.5 grams) with a M. P. of 154–156° C. by consecutive crystallizations using (1) 100 cc. of alcohol and 1,000 cc. of ether, (2) 80 cc. of alcohol and 500 cc. of ether, and finally (3) 80 cc. of alcohol and 60 cc. of ether.

Anal. Calcd. for $C_{19}H_{23}NCl_2$: Cl ion, 10.6; Cl total, 21.1. Found: Cl ion, 10.3; Cl total, 21.1.

EXAMPLE 4

*Preparation of N-p-methoxybenzyl-N(2-chloroethyl) cinnamylamine hydrochloride*

(a) PREPARATION OF 2-p-METHOXYBENZYLAMINOETHANOL

Ninety-five grams of p-methoxybenzyl chloride were dropped during one hour into 220 grams of 2-aminoethanol while the contents were stirred and heated at 110° C. Heating at 110° C. was continued for 3 hours. After cooling to 80° C. a solution of 25 grams of sodium hydroxide in 40 cc. of water and 400 cc. of alcohol were added to the reaction mixture. The sodium chloride was precipitated nearly completely by cooling to 0° C. and was filtered off. The solvent was removed by distillation in low vacuum. 70.9 grams of 2-p-methoxybenzylaminoethanol with a purity of 99.2% (as measured by potentiometric titration) distilled as a yellow oil at 175–180° C. (4 millimeters of mercury).

(b) PREPARATION OF 2-(N-p-METHOXYBENZYL-N-CINNAMYL) AMINOETHANOL

Thirty-one grams of cinnamyl chloride were dropped during 2 hours into 70 grams of 2-p-methoxybenzylaminoethanol while the contents were stirred and heated at 110° C. The reaction was completed on heating the mixture for 5 hours at 110° C. and finally for 10 minutes at 160° C. After allowing the mixture to cool to room temperature 200 cc. of a 20% sodium hydroxide solution were added and the amino alcohols were extracted with 300 cc. of benzene. The benzene layer was washed with 400 cc. of water and dried with anhydrous sodium sulfate. After removal of the solvent 36.2 grams of the desired amino alcohol with a B. P. of 245–255° C. (4 millimeters of mercury) and a purity of 99.4% (as measured by potentiometric titration) were obtained by vacuum distillation.

(c) PREPARATION OF N-p-METHOXYBENZYL-N-(2-CHLOROETHYL) CINNAMYLAMINE HYDROCHLORIDE

Twenty-nine and seven tenths grams of 2-(N-p-methoxybenzyl-N-cinnamyl) aminoethanol dissolved in 100 cc. of chloroform were brought to reaction with a solution of 15 grams of thionyl chloride in 100 cc. of chloroform following the procedure described in Example 1b. A resin was obtained which became crystalline after being kept in absolute ether for two months. Recrystallization from 100 cc. of ethyl alcohol and 700 cc. of ether and from 100 cc. of alcohol and 600 cc. of ether yielded 7.5 grams of white crystals; M. P. 134–136° C.

Anal. Calcd. for $C_{19}H_{23}NOCl_2$: Cl ion, 10.1; Cl total, 20.2. Found: Cl ion, 10.4; Cl total, 20.2.

The foregoing illustrates the practice of this invention, which however, is not to be limited thereby but is to be construed as broadly as permissible in view of the prior art and limited solely by the appended claims.

We claim:

1. Compounds having the general formula:

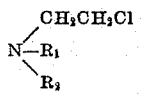

wherein $R_1$ is a member selected from the group consisting of $C_2H_5$, benzyl and methoxybenzyl and $R_2$ is a member selected from the group consisting of cinnamyl and methyl cinnamyl; and salts thereof with acids.

2. N - 2-chloroethyl) - N-cinnamyl ethylamine hydrochloride.

3. N-benzyl-N-(2-chloroethyl) cinnamylamine hydrochloride.

4. N - benzyl - N - (2-chloroethyl) - o - methyl cinnamylamine hydrochloride.

5. N - p-methoxybenzyl - N - (2 - chloroethyl) cinnamylamine hydrochloride.

WILLIAM S. GUMP.
EDWARD JOSEPH NIKAWITZ.

REFERENCES CITED

The following references are of record in the file of this patent:

Nickerson et al.: Fed. Proc., vol. 5, pp. 194–195 (1946).

Goldin et al.: J. Pharm. Exp. Therapy, vol. 94, p. 256 (1948).

Hunt: J. Pharm. Exp. Therapy, vol. 95, pp. 177–184 (1949).